United States Patent
Yamamoto

(10) Patent No.: US 10,699,390 B2
(45) Date of Patent: Jun. 30, 2020

(54) IMAGE PROCESSING APPARATUS AND IMAGE PROCESSING METHOD

(71) Applicant: YAMAHA CORPORATION, Hamamatsu-shi (JP)

(72) Inventor: Kazuhiko Yamamoto, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 114 days.

(21) Appl. No.: 15/938,293

(22) Filed: Mar. 28, 2018

(65) Prior Publication Data

US 2018/0218480 A1     Aug. 2, 2018

Related U.S. Application Data

(63) Continuation of application No. PCT/JP2016/079051, filed on Sep. 30, 2016.

(30) Foreign Application Priority Data

Sep. 30, 2015   (JP) .................................. 2015-194929

(51) Int. Cl.
   *G06T 5/00*    (2006.01)
   *G06T 5/50*    (2006.01)
   (Continued)

(52) U.S. Cl.
   CPC .......... *G06T 5/006* (2013.01); *G06K 9/00469* (2013.01); *G06T 5/50* (2013.01);
   (Continued)

(58) Field of Classification Search
   CPC .. G06T 5/006; G06T 5/00; G06T 5/20; G06T 5/50; G06T 11/60; G06T 2207/20212;
   (Continued)

(56) References Cited

U.S. PATENT DOCUMENTS

| | | | | |
|---|---|---|---|---|
| 2002/0047901 A1* | 4/2002 | Nobori | ...................... | B60R 1/00 348/149 |
| 2003/0133019 A1* | 7/2003 | Higurashi | ............. | G06T 3/0081 348/218.1 |

(Continued)

FOREIGN PATENT DOCUMENTS

| | | |
|---|---|---|
| JP | 2009151712 A | 7/2009 |
| JP | 2013093704 A | 5/2013 |
| WO | 2015087383 A1 | 6/2015 |

OTHER PUBLICATIONS

English translation of Written Opinion issued in Intl. Appln. No. PCT/JP2016/079051 dated Dec. 27, 2016, previously cited in IDS filed Mar. 28, 2018.
(Continued)

*Primary Examiner* — Dwayne D Bost
*Assistant Examiner* — Stephen M Brinich
(74) *Attorney, Agent, or Firm* — Rossi, Kimms & McDowell LLP

(57) ABSTRACT

An image processing apparatus includes a processor and a memory having stored thereon instructions executable by the processor to cause the image processing apparatus to perform: calculating, with respect to each of a plurality of captured images obtained by successively capturing a subject, an evaluation index as an index as to whether a capturing condition is appropriate or not for each of a plurality of partial images of the each of the plurality of captured images corresponding to different areas of the subject; selecting the plurality of partial images corresponding to the different areas of the subject from the plurality of captured images based on the evaluation indices of the partial images; and synthesizing the plurality of selected partial images in positions corresponding to partial images in a reference image obtained by capturing the subject.

8 Claims, 7 Drawing Sheets

(51) Int. Cl.
*G06T 7/00* (2017.01)
*G06K 9/46* (2006.01)
*H04N 5/265* (2006.01)
*H04N 5/232* (2006.01)
*H04N 5/262* (2006.01)
*G06K 9/00* (2006.01)

(52) U.S. Cl.
CPC .......... *G06T 7/0002* (2013.01); *H04N 5/232* (2013.01); *H04N 5/265* (2013.01); *H04N 5/2628* (2013.01); *G06K 9/4604* (2013.01); *G06T 2207/20221* (2013.01); *G06T 2207/30168* (2013.01); *G06T 2207/30176* (2013.01)

(58) Field of Classification Search
CPC . G06T 2207/20221; G06T 2207/20172; G06T 7/0002; G06T 7/00; G06K 9/00469; G06K 9/00463; G06K 9/00442; G06K 9/00026
USPC .......... 382/282–284, 276, 293–297
See application file for complete search history.

(56) References Cited

U.S. PATENT DOCUMENTS

| | | | |
|---|---|---|---|
| 2005/0053309 A1* | 3/2005 | Szczuka | G06T 5/20 382/284 |
| 2006/0115124 A1* | 6/2006 | Nobori | B60R 1/00 382/104 |
| 2009/0158915 A1 | 6/2009 | Ishii et al. | |
| 2016/0232405 A1 | 8/2016 | Iwayama | |

OTHER PUBLICATIONS

International Search Report issued in Intl. Appln. No. PCT/JP2016/079051 dated Dec. 27, 2016. English translation provided.

Written Opinion issued in Intl. Appln. No. PCT/JP2016/079051 dated Dec. 27, 2016.

Office Action issued in Japanese Appln. No. 2015-194929 dated Oct. 1, 2019. English translation provided.

Office Action issued in Japanese Appln. No. 2015-194929 dated Mar. 3, 2020. English translation provided.

* cited by examiner

IMAGE PROCESSING APPARATUS AND IMAGE PROCESSING METHOD

CROSS REFERENCE TO RELATED APPLICATIONS

This application is a continuation of PCT application No. PCT/JP2016/079051, which was filed on Sep. 30, 2016 based on Japanese Patent Application (No. 2015-194929) filed on Sep. 30, 2015, the contents of which are incorporated herein by reference.

BACKGROUND OF THE INVENTION

1. Field of the Invention

The present invention relates to a technique of correcting an image obtained by capturing a subject such as a musical score.

2. Description of the Related Art

Techniques of processing images captured by users have conventionally been proposed. For example, JP-A-2013-93704 discloses a technique of, when a user captures a book by using a capturing apparatus such as a digital camera, correcting distortion of the captured image reflecting deformation (typically, curve) of the surface of the book.

Although distortion of the captured image can be reduced by the image processing disclosed in JP-A-2013-93704, for example, under a condition where the surface of the subject is largely curved, it is actually difficult to sufficiently correct the distortion of the captured image. Therefore, intrinsically, it is desirable to perform capturing under a condition where the deformation of the surface of the subject such as a book is reduced, for example, by the user pressing the surface with a hand or the like. However, there is a problem in that a wide area of the subject (for example, the entire area of one page of a book) cannot be captured since the part of the subject pressed by the user is hidden behind the user's hand.

SUMMARY OF THE INVENTION

In view of the above circumstances, an object of the present invention is to generate an image of an excellent capturing condition over a wide area of the surface of the subject.

To solve the above-mentioned problem, an image processing apparatus according to the present invention includes a processor and a memory having stored thereon instructions executable by the processor to cause the image processing apparatus to perform: calculating, with respect to each of a plurality of captured images obtained by successively capturing a subject, an evaluation index as an index as to whether a capturing condition is appropriate or not for each of a plurality of partial images of the each of the plurality of captured images corresponding to different areas of the subject; selecting the plurality of partial images corresponding to the different areas of the subject from the plurality of captured images based on the evaluation indices of the partial images; and synthesizing the plurality of selected partial images in positions corresponding to partial images in a reference image obtained by capturing the subject.

DETAILED DESCRIPTION OF THE EXEMPLARY EMBODIMENTS

First Embodiment

Figure 1:
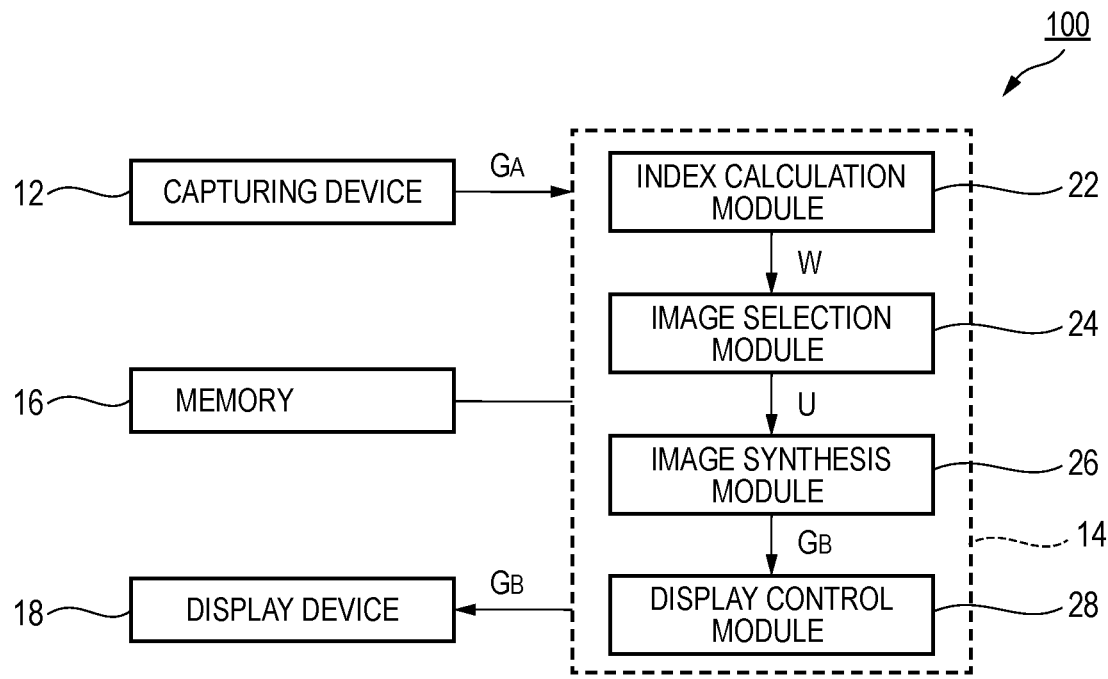
FIG. 1 is a configuration diagram of an image processing apparatus according to a first embodiment of the present invention.

FIG. 1 is a configuration diagram of an image processing apparatus 100 according to a first embodiment. As shown by example in FIG. 1, the image processing apparatus 100 of the first embodiment is implemented by a computer system provided with a capturing device 12, a control device 14, a memory 16 and a display 18. For example, a portable information processing apparatus such as a mobile telephone or a smartphone, or a portable or stationary information processing apparatus such as a personal computer may be used as the image processing apparatus 100. Moreover, the image processing apparatus 100 may also be implemented by a capturing apparatus used exclusively for capturing still images and moving images (for example, a digital camera or a digital camcorder).

The capturing device 12 is an image input device for capturing images, and is structured so as to include an imaging element that converts the incident light from the subject into an electric signal. The capturing device 12 of the first embodiment takes a moving image with a musical score describing the contents of a musical piece, as a subject, and successively generates and outputs a plurality of images (hereinafter, referred to as "captured images") GA constituting the moving image. The format of the image data representative of the captured images GA is arbitrary. While a structure in which the capturing device 12 is mounted on the image processing apparatus 100 is shown by example in the first embodiment, a structure may be adopted in which the capturing device 12 separate from the image processing apparatus 100 is connected to the image processing apparatus 100 by cable or by radio. Moreover, the image processing apparatus 100 may process, as the captured images GA, images selected (captured), for example, at predetermined intervals from a plurality of images chronologically generated by the capturing device 12.

Figure 2:
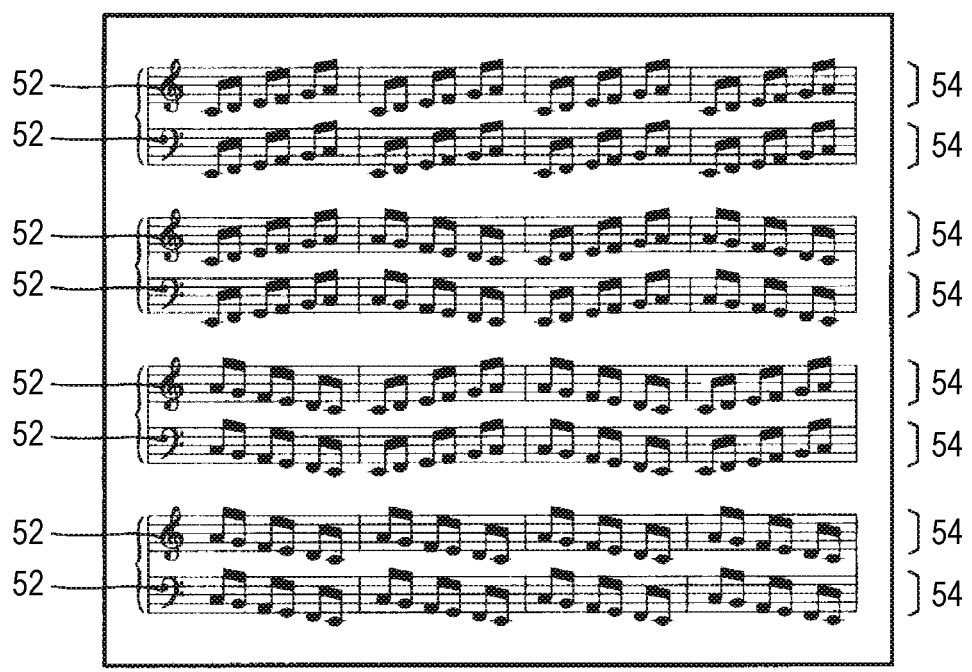
FIG. 2 is an explanatory view of a musical score which is an example of the subject.

FIG. 2 is a schematic view of a musical score as the subject of the capturing by the capturing device 12. As shown by example in FIG. 2, the musical score contains a plurality of staffs 54 (staff notation in the example of FIG. 2) disposed in parallel in the longitudinal direction at intervals therebetween. The plurality of staffs 54 are each formed of a plurality of horizontal straight lines representative of different pitches. A musical character (clef) 52 such as a G clef or an F clef is disposed in a predetermined position (for example, in the neighborhood of the left end) on each of the plurality of staffs 54, and symbols expressing the musical piece (for example, musical notes, rests, accidentals, etc.) are disposed in arbitrary positions of the staffs 54.

When the musical score is captured with the surface thereof being deformed (typically, curved), distortion due to the deformation is caused in the captured images GA. The user can reduce the deformation (that is, flatten the surface of the musical score) by pressing the surface of the musical score with a hand or the like. In the first embodiment, the user's act of pressing part of the musical score and moving the pressed position with time is captured as a series of moving images by the capturing device 12. For example, as shown by example in FIG. 3, at a specific time point t1 of the moving image captured by the capturing device 12, a condition where the user is pressing the lower half of the musical score with a hand H is captured as a captured image GA1, and at a time point t2 after the elapse of the time point t1, a condition where the user is pressing the upper half of the musical score with the hand H is captured as a captured image GA2. That is, the position of the musical score where the user presses with the hand H moves upward from the time point t1 to the time point t2. In the captured image GA1 at the time point t1, the upper half of the musical score is in an appropriate capturing condition where distortion is reduced, whereas the lower half of the musical score is hidden by the user's hand H. Moreover, in the captured image GA2 at the time point t2, the lower half of the musical score is in an appropriate capturing condition where distortion is reduced, whereas the upper half of the musical score is hidden by the user's hand H. That is, movement with time of the area of the musical score in an appropriate capturing condition where distortion is reduced is captured as a series of moving images by the capturing device 12.

Figure 3:
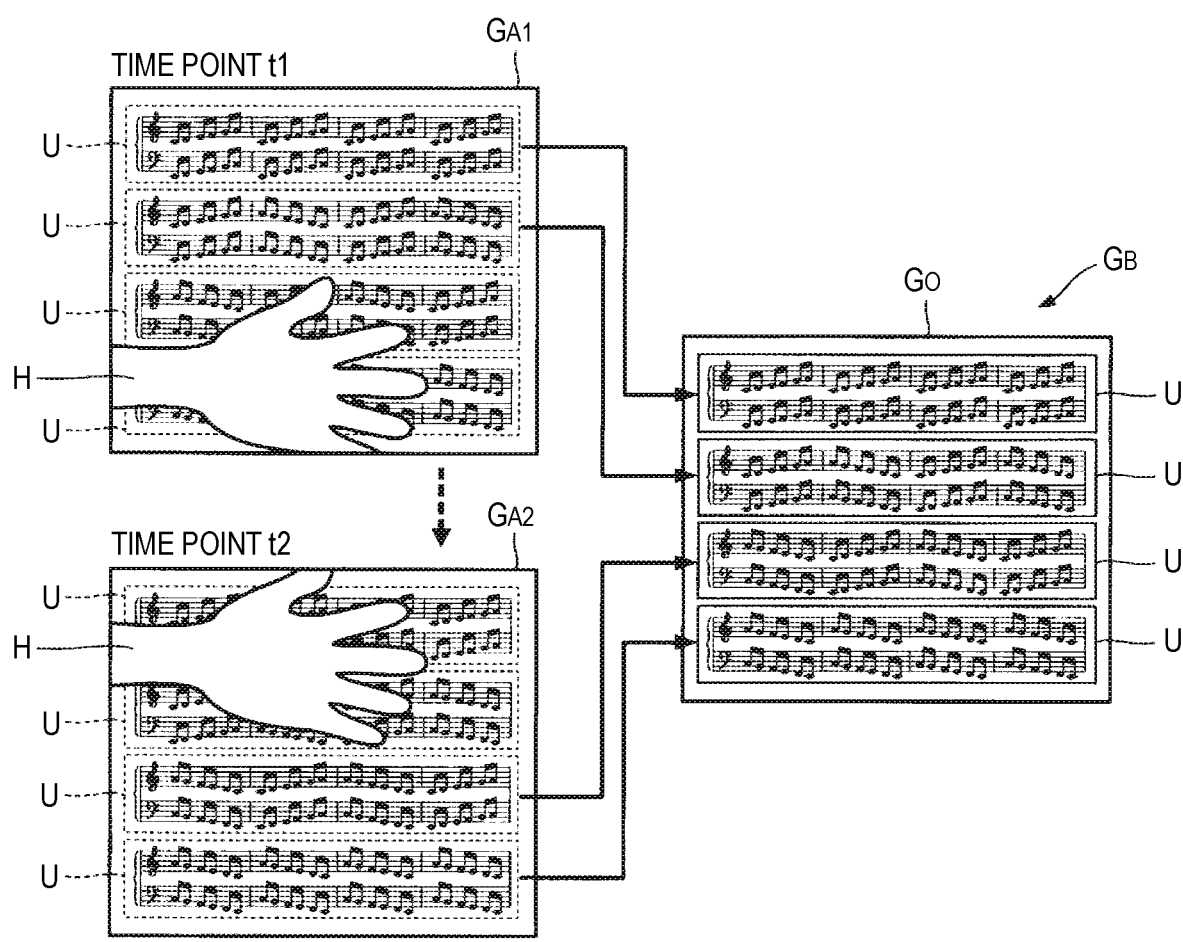
FIG. 3 is an explanatory view of a brief operation of the image processing apparatus.

The image processing apparatus 100 of the first embodiment generates a synthetic image GB by using a plurality of captured images GA successively captured by the capturing device 12. The synthetic image GB is an image of the musical score where distortion of the surface is reduced. Specifically, as shown by example in FIG. 3, the image processing apparatus 100 zones each captured image GA into a plurality of parts (hereinafter, referred to as "partial images") U, selects partial images U in an area in the appropriate capturing condition where deformation of the musical score is reduced by the pressing by the user from a plurality of captured images GA, and synthesizes (for example, pastes) them to a given reference image G0, thereby generating the synthetic image GB. The plurality of partial images U of one given captured image GA are areas of the captured image GA corresponding to different areas of the musical score. In the example of FIG. 3, a synthetic image GB is generated where the two partial images U in the area of the upper half of the captured image GA1 where the capturing condition is appropriate (that is, the area not hidden by the user's hand H) and the two partial images U in the area of the lower half of the captured image GA2 where the capturing condition is appropriate are synthesized to the reference image G0. The reference image G0 is an image obtained by capturing the musical score. Specifically, of the plurality of captured images GA successively captured by the capturing device 12, one captured image GA where the capturing condition of the entire image is excellent (however, it is not as excellent as that when the user flattens the musical score by pressing it) is selected as the reference image G0.

The display 18 (for example, a liquid crystal display panel) of FIG. 1 displays the image specified by the control device 14. For example, the synthetic image GB is displayed on the display 18. The memory 16 is formed of a known recording medium such as a magnetic recording medium or a semiconductor recording medium or of a combination of a plurality of kinds of recording media, and stores a program executed by the control device 14 and various pieces of data used by the control device 14.

The control device 14 is formed of an arithmetic processing unit such as a CPU (central processing unit), and by executing the program stored in the memory 16, implements a plurality of functions (an index calculation module 22, an image selection module 24, an image synthesis module 26, a display control module 28) for generating the synthetic image GB from a plurality of captured images GA successively generated by the capturing device 12 as shown by example in FIG. 1. A structure where some of the functions of the control device 14 are implemented by an electronic circuit dedicated for image processing and a structure where the functions of the control device 14 are distributed to a plurality of devices may be adopted.

Figure 4:
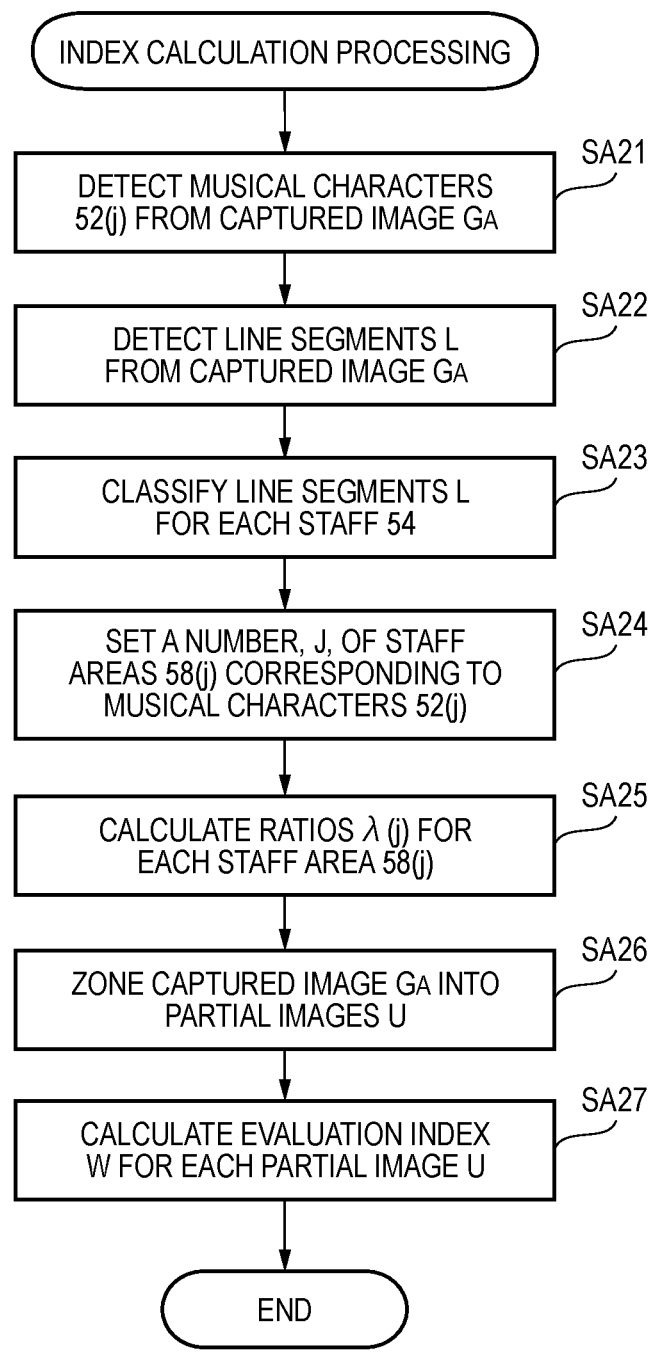
FIG. 4 is a flowchart of index calculation processing.

The index calculation module 22 calculates, with respect to each of the plurality of captured images GA successively generated by the capturing device 12, an evaluation index W for each partial image U of the captured image GA. FIG. 4 is a flowchart of the processing where the index calculation module 22 of the first embodiment calculates the evaluation index W for each partial image U with respect to one given captured image GA (hereinafter, referred to as "index calculation processing"). For example, the index calculation processing of FIG. 4 is executed every generation of a captured image GA by the capturing device 12.

Figure 5:
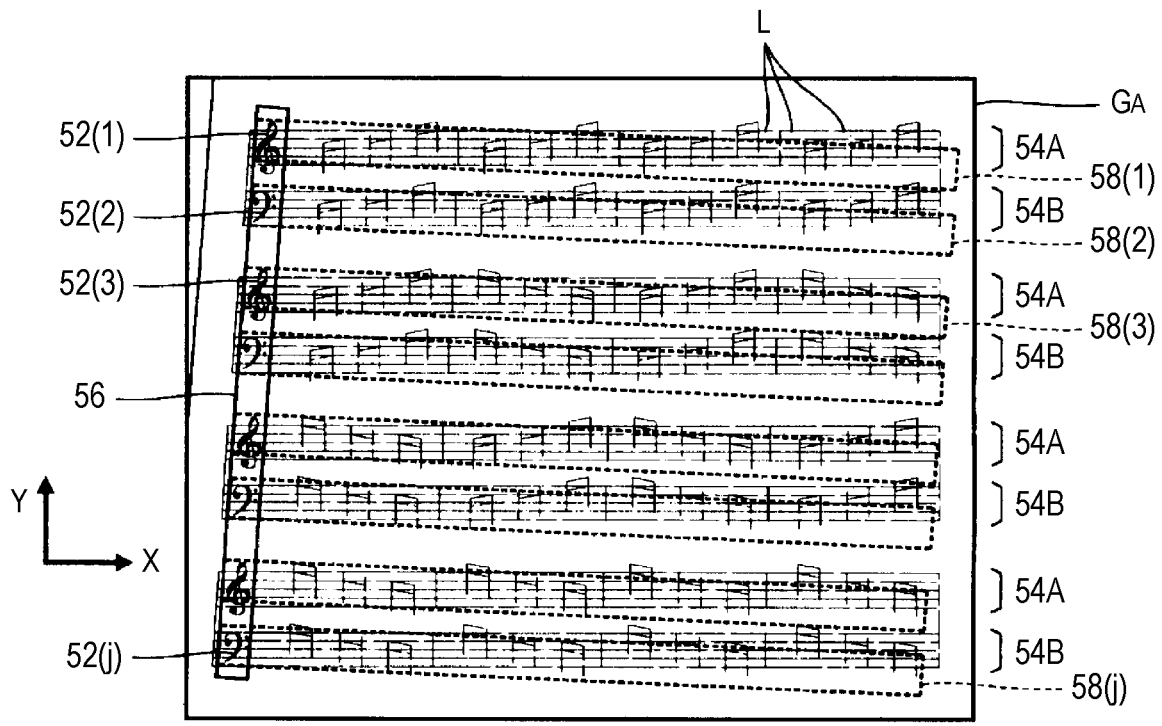
FIG. 5 is an explanatory view of the index calculation processing.

When the index calculation processing is started, as shown by example in FIG. 5, the index calculation module 22 detects a plurality of (a number, J, of) musical characters 52(1) to 52(J) from the captured image GA (SA21). For the detection of the musical characters 52($j$) ($j$=1 to J), a known image recognition technique (pattern recognition) may be adopted. The total number J of the musical characters 52($j$) is a variable value corresponding to the contents (the number of staffs) of the musical score. In the following description, the lateral direction of the captured image GA is denoted as X direction, and the longitudinal direction of the captured image GA is denoted as Y direction.

Under a condition where the direction of capturing by the capturing device 12 is parallel to the normal direction of the musical score and the X direction of the captured image GA is parallel to the lateral direction of the musical score (hereinafter, referred to as "reference condition"), an array 56 of the number, J, of musical characters 52(1) to 52(J) (hereinafter, referred to as "musical character array") is substantially parallel to the Y direction. However, in an inclined condition where the capturing direction is inclined with respect to the normal direction of the musical score, as shown by example in FIG. 5, the musical character array 56 is inclined with respect to the Y direction.

The index calculation module 22 detects a plurality of line segments L constituting the musical score from the captured image GA (SA22). For the detection of the plurality of line segments L, a known feature extraction (straight line detection) such as probabilistic Hough transform may be arbitrarily adopted. As shown by example in FIG. 5, a multiplicity of line segments L constituting the staffs 54 of the captured image GA are detected. Since linear parts such as stems and tails of notes and bar lines are also detected in actuality, the majority are line segments L constituting the staffs 54. The order of the detection of the musical characters 52(*j*) (SA21) and the detection of a plurality of line segments L (SA22) may be reversed.

The index calculation module 22 classifies, for each staff 54, the plurality of line segments L detected from the captured image GA (SA23). For the classification of the plurality of line segments L, a known clustering technique (for example, K-means) may be arbitrarily adopted. Considering that a musical character 52(*j*) is arranged on each staff 54, a method is suitable where the plurality of line segments L are classified into a number, J, of aggregations (clusters) which number J corresponds to the total number of the musical characters 52(*j*).

The index calculation module 22 sets, as shown by example in FIG. 5, a number, J, of staff areas 58(1) to 58(J) corresponding to the musical characters 52(*j*) detected from the captured image GA (SA24). That is, a staff area 58(*j*) is set for each musical character 52(*j*) (for each staff 54). As is understood from FIG. 5, the staff area 58(*j*) of one given musical character 52(*j*) is a rectangular area intersecting the musical character array 56 in the position of the musical character 52(*j*). Specifically, the staff area 58(*j*) extends in a direction orthogonal to the musical character array 56 with the musical character array 56(*j*) as the endpoint.

The index calculation module 22 calculates ratios λ(j) (λ(1) to λ(J)) for each of the number, J, of staff areas 58(1) to 58(J) (SA25). The ratio λ(j) calculated for one given staff area 58(*j*) is the ratio at which the j-th staff 54 in the musical score is contained in the staff area 58(*j*). Specifically, the index calculation module 22 calculates the ratio λ(j) at which the plurality of line segments L classified into the j-th staff 54 (SA23) are contained in the staff area 58(*j*). For example, the ratio of the number of endpoints, contained in the staff area 58(*j*), of the endpoints of the plurality of line segments L is suitable as the ratio λ(j).

In the reference condition, while the staffs 54 extend in the X direction, the number, J, of musical characters 52(1) to 52(J) are arranged substantially parallel to the Y direction, whereby each staff area 58(*j*) extends in a direction substantially parallel to the X direction (that is, a direction parallel to the j-th staff 54). Therefore, a large majority of the plurality of line segments L corresponding to the j-th staff 54 are contained in the staff area 58(*j*), and as a result, the ratio λ(j) is a high numerical value. On the other hand, in the inclined condition where the capturing direction is inclined with respect to the musical score, for example, as shown by example in FIG. 5, while the staffs 54 extend in the X direction, the musical character array 56 is inclined with respect to the Y direction, whereby the staff areas 58(*j*) are inclined with respect to the X direction. Therefore, as is understood from FIG. 5, the ratio of the portion, not contained in the staff area 58(*j*), of the line segments L detected from the j-th staff 54 increases compared with that in the reference condition, and as a result, the ratio λ(j) is a low numerical value. As is understood from the above description, the ratio λ(j) is usable as the index of the degree of inclination of the capturing direction of the capturing device 12 with respect to the normal direction of the musical score (the index as to whether the capturing condition is appropriate or not).

Figure 6:
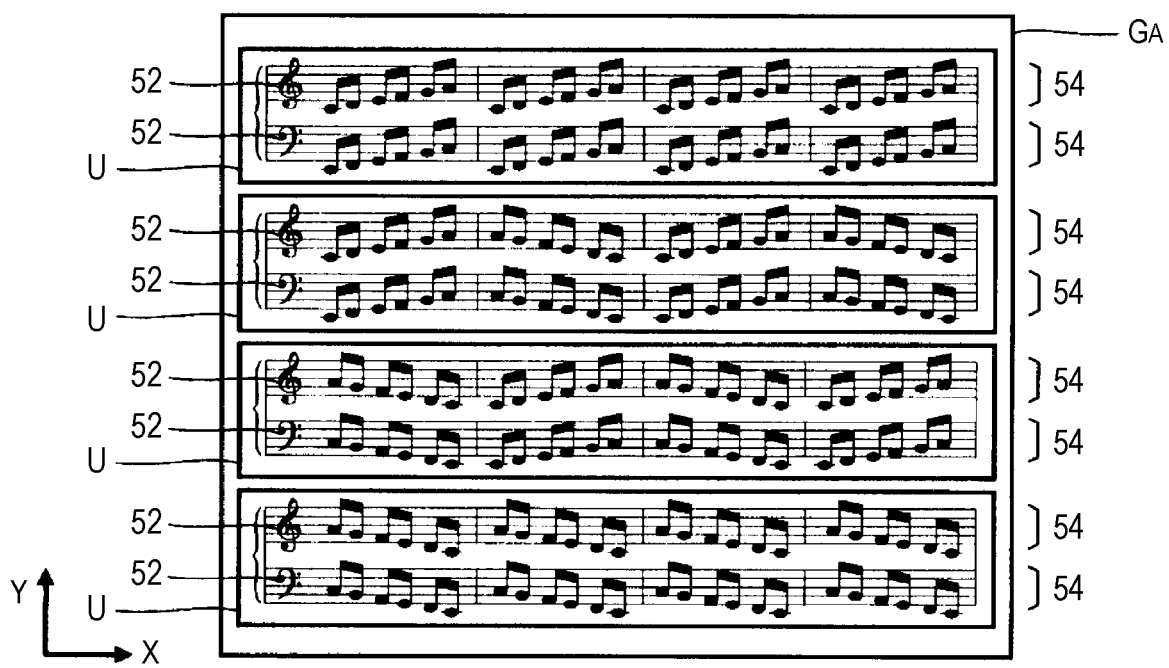
FIG. 6 is an explanatory view of the processing of zoning a plurality of partial images in captured images.

The index calculation module 22 zones the captured image GA into the plurality of partial images U every aggregation of a predetermined number of adjoining staffs 54 (SA26). The partial images U are each a rectangular area surrounded by two sides parallel to the X direction and two sides parallel to the Y direction. In the first embodiment, as shown by example in FIG. 6, an area corresponding to a grand staff in which two of a staff 54A where a G clef is disposed and a staff 54B where an F clef is disposed are juxtaposed in the longitudinal direction at a distance from each other is zoned as one partial image U in the captured image GA. Consequently, a number of partial images U which number corresponds to half the total number J of the staffs (or the musical characters 52(*j*)) are zoned in the captured image GA.

The index calculation module 22 calculates the evaluation index W corresponding to the above-mentioned ratio λ(j) for each partial image U (SA27). Specifically, the index calculation module 22 calculates the evaluation index W corresponding to the ratio λ(j) calculated for the G clef staff 54A of one given partial image U and the ratio λ(j+1) calculated for the F clef staff 54B thereof. For example, the average or the weighted sum of the ratio λ(j) and the ratio λ(j+1) is calculated as the evaluation index W. Since the ratio λ(j) of each staff 54 increases as the capturing direction becomes closer to the reference condition as mentioned above, the evaluation index W is a high numerical value. Moreover, since the processing such as the detection of the musical characters 52(*j*) and the line segments L is inhibited in the area of the musical score where the user's hand H is superimposed, the evaluation index W of the partial image U containing the user's hand H is a low numerical value. As is understood from the above description, the evaluation index W of each partial image U is usable as the index as to whether the capturing condition (for example, the capturing direction of the capturing device 12 and the presence or absence of the user's hand H) of the partial image U is appropriate or not. By the index calculation processing of FIG. 4 shown above by example, the evaluation index W is calculated for each partial image U of the captured image GA.

The image selection module 24 of FIG. 1 selects a plurality of partial images U corresponding to different areas of the musical score from a plurality of captured images GA according to the evaluation indices W of the partial images U. Specifically, the image selection module 24 successively selects the partial images U the evaluation indices W of which are higher than a predetermined threshold value WTH from the captured images GA. That is, of the plurality of partial images U of the captured images GA, partial images U the capturing conditions of which are excellent (for example, partial images U where the capturing direction is closely analogous to the reference condition and the user's hand H is not superimposed) are successively selected from the captured images GA.

The image synthesis module 26 generates the synthetic image GB by synthesizing each of the plurality of partial images U selected by the image selection module 24 to the reference image G0. The image synthesis module 26 of the first embodiment synthesizes (for example, pastes) one given partial image U in the position, corresponding to the partial image U, of the reference image G0. Specifically, the image synthesis module 26 extracts feature points for each of the reference image G0 and the partial image U, and the position of the partial image U with respect to the reference image G0 is adjusted so that corresponding ones of a plurality of feature points extracted from the reference image G0 and a plurality of feature points extracted from the partial image U coincide with each other. Therefore, in the area of a specific staff 54 of the musical score in the reference image G0, the partial image U containing the staff 54 is pasted. For the feature point extraction, a known image analysis technique (feature extraction analysis) may be arbitrarily adopted. It is possible to adjust the size of the partial image U before synthesizing it to the reference image G0.

As is understood from the above description, a synthetic image GB is generated where a plurality of partial images U in the excellent capturing condition selected from a plurality of captured images GA are arranged. The display control module 28 of FIG. 1 causes the display 18 to display the synthetic image GB synthesized by the image synthesis module 26.

Figure 7:
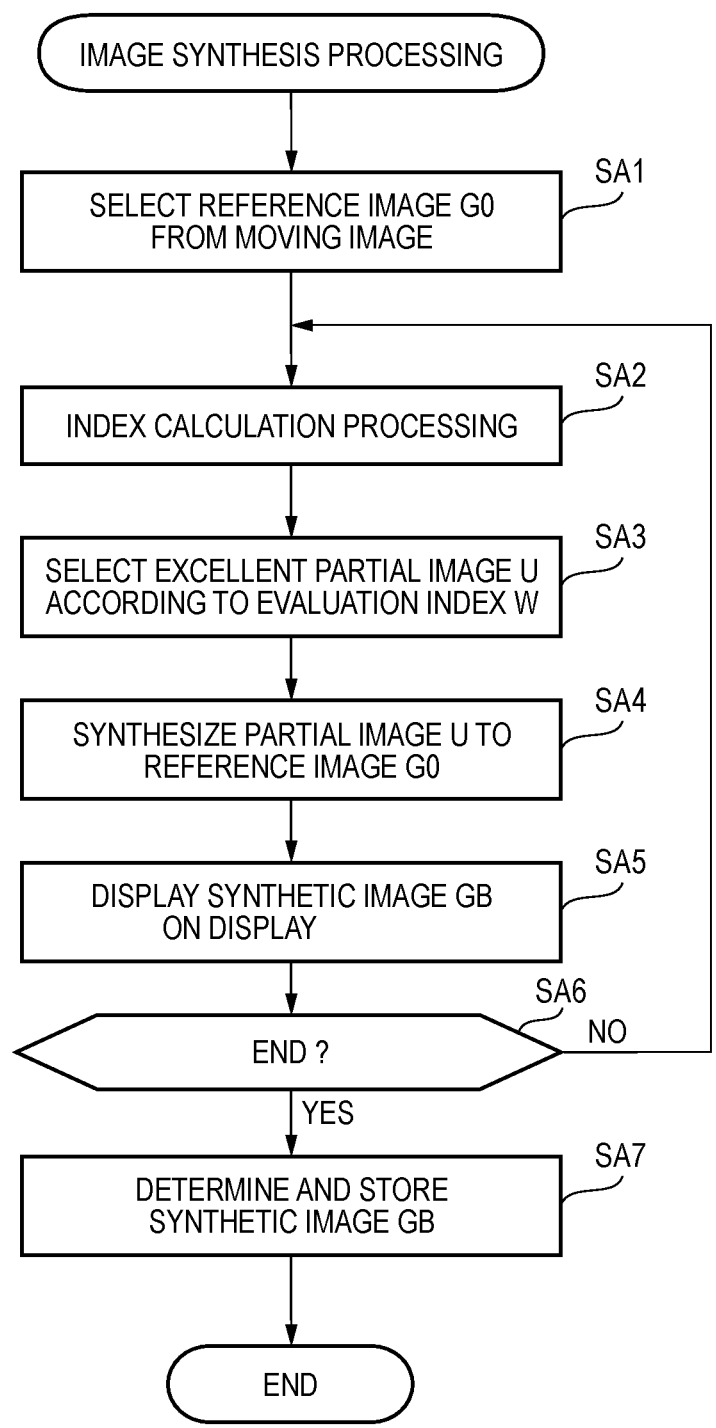
FIG. 7 is a flowchart of image synthesis processing.

FIG. 7 is a flowchart of the processing where the image processing apparatus 100 of the first embodiment generates the synthetic image GB (hereinafter, referred to as "image synthesis processing"). An instruction from the user starts the moving image capturing by the capturing device 12 and the image synthesis processing of FIG. 7.

The control device 14 selects the reference image G0 from among the captured images GA successively supplied from the capturing device 12 (SA1). Specifically, the control device 14 (the index calculation module 22) successively calculates for each captured image GA an image index WG as the index as to whether the general capturing condition of the captured image GA is appropriate or not, and selects the captured image GA the image index WG of which is higher than a predetermined threshold value as the reference image G0. The image index WG is, for example, a numerical value corresponding to the evaluation index W of all the partial images U of the captured image GA (for example, the sum total or the weighted value of the evaluation index W). Since the image index WG of the captured image GA containing the user's hand H is a sufficiently low numerical value, for example, a captured image GA not containing the user's hand H is selected as the reference image G0.

The control device 14 calculates the evaluation index W for each partial image U by executing the index calculation processing of FIG. 4 with respect to the captured image GA supplied from the capturing device 12 (SA2). The image selection module 24 selects a partial image U the evaluation index W of which is higher than the threshold value WTH from the captured image GA (SA3). The image synthesis module 26 generates the synthetic image GB by synthesizing the partial image U selected by the image selection module 24 to the reference image G0 (SA4). When no partial image U the evaluation index W of which is higher than the threshold value WTH is contained in the captured image GA, the selection of the partial image U (SA3) and the synthesis of the partial image U (SA4) are not executed. The display control module 28 causes the display 18 to display the synthetic image GB generated by the image synthesis module 26 (SA5).

The user can provide an instruction to end capturing at an arbitrary point of time. When the user does not provide an instruction to end capturing (SA6: NO), the processing from step SA2 to step SA5 is similarly executed for the captured image GA supplied from the capturing device 12 immediately thereafter. That is, in real time in parallel with the moving image capturing by the capturing device 12 (specifically, every generation of the captured image GA), the calculation of the evaluation index W for each partial image U (SA2), the selection of the partial image U (SA3), the synthesis of the partial images U to the reference image G0 (SA4) and the display of the synthetic image GB (SA6) are executed. Therefore, with the progress of the image capturing by the capturing device 12, areas of the reference image G0 are successively replaced by the partial images U the capturing conditions of which are excellent.

The user instantaneously confirms the synthetic image GB on the display 18 in parallel with the capturing of the musical score by the capturing device 12, and provides an instruction to end capturing when it is determined that an excellent synthetic image GB is generated (for example, when the entire area of the musical score is replaced by the partial images U the capturing conditions of which are excellent). When the user provides an instruction to end capturing (SA6: YES), the control device 14 determines the latest synthetic image GB at the time of the provision of the instruction as the final processing result, and stores it in the memory 16 (SA7).

As described above, in the first embodiment, a plurality of partial images U selected according to the evaluation index W from a plurality of captured images GA are synthesized in the positions, corresponding to the partial images U, of the reference image G0. That is, a plurality of partial images U the capturing conditions of which are excellent (for example, the images of the area that the user is not pressing) are synthesized to the reference image G0. Consequently, a synthetic image GB the capturing condition of which is excellent over a wide area of the musical score can be generated.

Moreover, in the first embodiment, since the calculation of the evaluation index W and the selection and synthesis of the partial image U are executed by using, as a unit, the partial image U obtained by zoning the captured image GA every aggregation of two staffs 54 (that is, a grand staff) in the musical score, the possibility is reduced that one staff 54 in the captured image GA is divided into a plurality of partial images U. Consequently, a natural image of the musical score where division or intermittence (for example, discontinuity of a straight line) of one staff 54 is suppressed can be generated.

In the first embodiment, the evaluation index W is calculated according to the ratio λ(j) of the staffs 54 in the staff area 58 (j) intersecting the musical character array 56 which is an array of a number, J, of musical characters 52(1) to 52(J) in the positions of the musical characters 52(j). Consequently, the evaluation index W by which whether the capturing direction is appropriate or not can be quantitatively evaluated can be calculated.

Moreover, in the first embodiment, with respect to each of the plurality of captured images GA constituting the moving image obtained by capturing a musical score, the calculation of the evaluation index W for each partial image U by the index calculation module 22 (SA2), the selection of the partial image U by the image selection module 24 (SA3) and the synthesis of the partial image U by the image synthesis module 26 (SA4) are successively executed in parallel with the capturing of a series of moving images by the capturing device 12. Consequently, the synthetic image GB can be generated in parallel with the progress of moving image capturing without the user providing a capturing instruction for each of the plurality of captured images GA.

Second Embodiment

A second embodiment of the present invention will be described. In the embodiments shown below by example, for elements the workings and functions of which are similar to those of the first embodiment, the reference numerals and signs used in the description of the first embodiment are also used and detailed descriptions thereof are omitted as appropriate.

Figure 8:
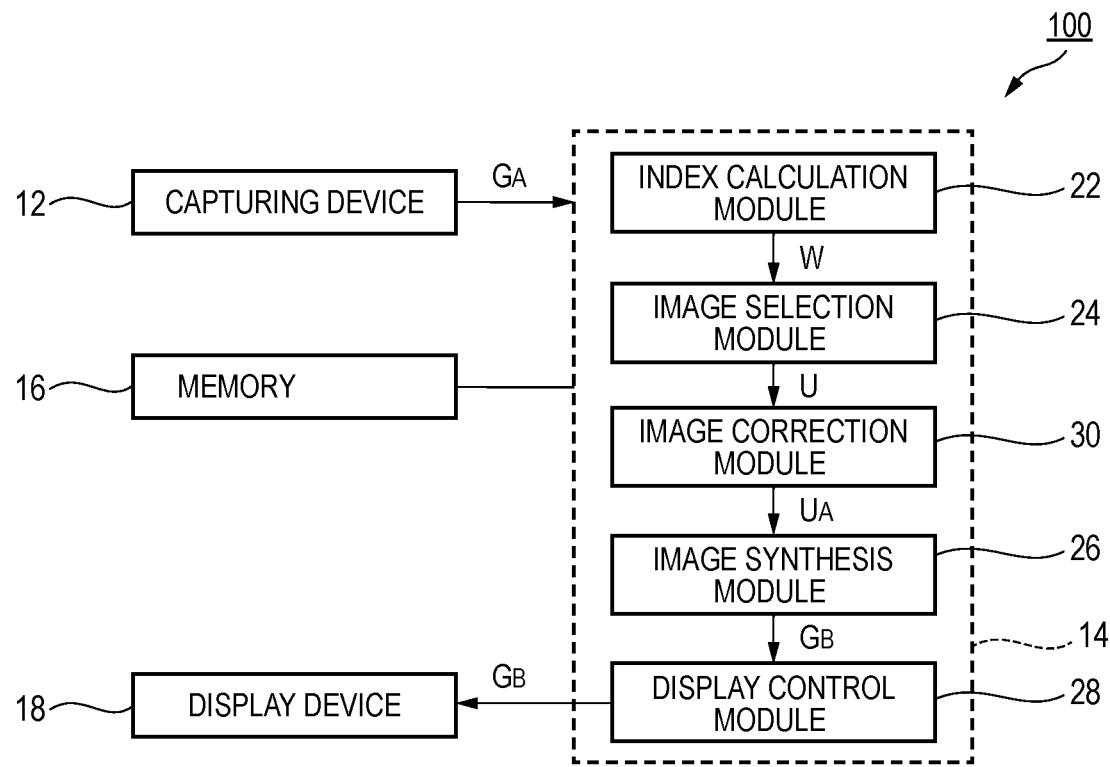
FIG. 8 is a configuration diagram of the image processing apparatus according to a second embodiment.

FIG. 8 is a configuration diagram of the image processing apparatus 100 of the second embodiment. As shown by example in FIG. 8, the control device 14 of the image processing apparatus 100 of the second embodiment functions as an image correction module 30 in addition to the elements similar to those of the first embodiment (the index calculation module 22, the image selection module 24, the image synthesis module 26 and the display control module 28). The image correction module 30 generates a partial image UA by correcting the partial image U selected by the image selection module 24. In the partial image U selected by the image selection module 24, although the capturing condition is excellent enough for the evaluation index W to be higher than the threshold value WTH, in actuality, distortion due to the deformation (for example, curve) of the surface of the musical score can occur. The image correction module 30 generates the partial image UA through correction for reducing the distortion of the musical score in the partial image U. The image synthesis module 26 generates the synthetic image GB by synthesizing a plurality of partial images UA corrected by the image correction module 30, to the reference image G0 as in the first embodiment.

Figure 9:
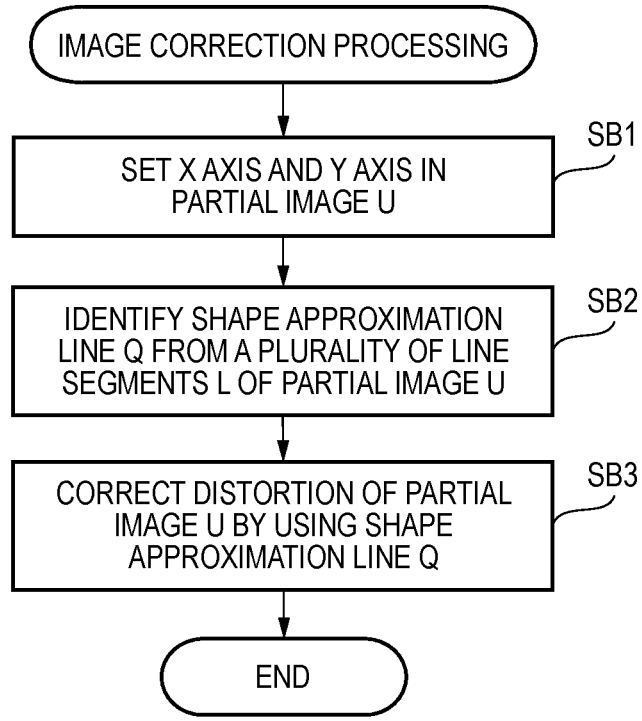
FIG. 9 is a flowchart of the image processing apparatus.

FIG. 9 is a flowchart of the processing where the image correction module 30 corrects the partial image U (hereinafter, referred to as "image correction processing"). When the image selection module 24 selects the partial image U, the image correction processing of FIG. 9 is executed.

Figure 10:
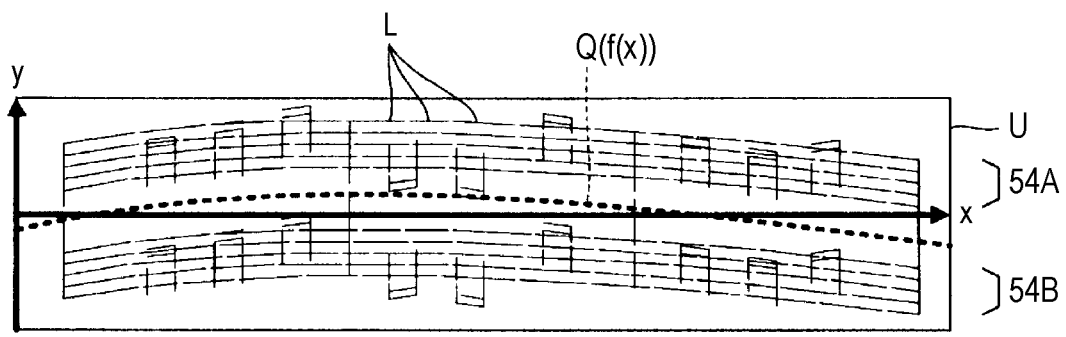
FIG. 10 is an explanatory view of the image processing apparatus.

As shown by example in FIG. 10, the image correction module 30 sets an x axis and a y axis orthogonal to each other in each partial image U (SB1). The y axis is an axis parallel to the longitudinal direction of the captured image GA, and the x axis is an axis parallel to the lateral direction of the captured image GA. As shown by example in FIG. 10, the midpoint at the edge parallel to the y axis situated on the left end of the partial image U is set as the intersection (that is, origin) between the x axis and the y axis. Therefore, most of the line segments L corresponding to the staffs 54A where G clefs are disposed are distributed in an area on the positive side of the y axis when viewed from the x axis, and most of the line segments L corresponding to the staffs 54B where F clefs are disposed are distributed in an area on the negative side of the y axis when viewed from the x axis. That is, the line segments L of the staffs 54A where G clefs are disposed and the line segments L of the staffs 54B where F clefs are disposed tend to be situated in positions opposite to each other with the x axis in between. In the following description, a case is assumed where a number, N, of line segments L are contained in one given partial image U. The total number N of the line segments L may differ among partial images U.

The image correction module 30 identifies a shape approximation line Q to approximate the surface shape of the musical score captured by the capturing device 12, from a plurality of line segments L detected from the partial image U (SB2). The shape approximation line Q is a curved line representative of a condition where one straight line laterally extending in the musical score is curved as shown by example by the broken line in FIG. 10. The shape approximation line Q of the second embodiment is expressed by a function f(x) within the x-y plane. While the concrete form of the function f(x) is arbitrary, for example, the shape approximation line Q can be expressed by the function f(x) of the following expression (1) containing a trigonometric function. A variable θk (k=0, 1, 2, . . . ) of the expression (1) is limited to a numerical value within a predetermined range (for example, −1<θk<1).

[Expression 1]

$$f(x) = \theta_0 + \theta_1 \sin(\theta_2 x + \theta_3) + \theta_4 \sin(\theta_5 x + \theta_6) + \ldots \quad (1)$$

Here, the form of the function f(x) expressing the shape approximation line Q is not limited to the above expression (1). For example, a function f(x) of a given form such as a linear function or a quadratic function may be adopted for the description of the shape approximation line Q. Moreover, a function f(x), selected by the user, of a plurality of kinds of functions may be used for the shape approximation line Q.

Figure 11:
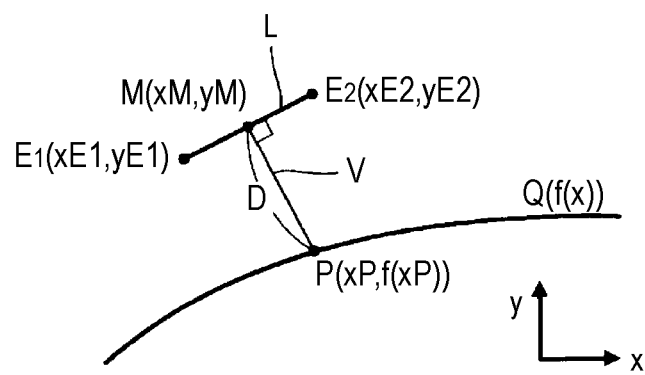
FIG. 11 is an explanatory view of the processing of identifying a shape approximation line.

FIG. 11 is an explanation view of the processing where the image correction module 30 identifies the shape approximation line Q (the function f(x)). FIG. 11 shows the shape approximation line Q expressed by the function f(x) and one given line segment L in the partial image U. One end point E1 of the line segment L is situated at coordinates (xE1, yE1), and the other end point E2 is situated at coordinates (xE2, yE2).

As shown by example in FIG. 11, a case is assumed where a straight line V passing a specific point (hereinafter, referred to as "specific point") M on one given line segment L intersects the shape approximation line Q at the intersection point P. The straight line V is, specifically, a perpendicular line of the line segment L. Moreover, the specific point M of the second embodiment is the midpoint of the line segment L, and situated at coordinates (xM, yM) (xM=(xE1+xE2)/2, yM=(yE1+yE2)/2). Moreover, the intersection point P of the straight line V and the shape approximation line Q is situated at coordinates (xP, f(xP)).

The image correction module 30 of the second embodiment identifies the shape approximation line Q (the function f(x)) so that the index (hereinafter, referred to as "distance index") Z(x) obtained by adding the distances D, between the specific point M on the line segment L and the intersection point P on the shape approximation line Q, of the number, N, of line segments L in the partial image U is minimized. That is, the image correction module 30 identifies the shape approximation line Q so that the intervals (distances D) of the line segments L from the shape approximation line Q are reduced as a whole with respect to a plurality of line segments L. Specifically, the processing (SB2) where the image correction module 30 of the second embodiment identifies the shape approximation line Q is expressed by the following expression (2) and expression (3):

[Expression 2]

$$\underset{xP, \theta k}{\arg \min} \; Z(x) = \sum_N \{(xP - xM)^2 + (f(xP) - yM)^2\} + \int f(x)^2 dx \quad (2)$$

$$\text{subject to:} \; (xP - xM, f(xP) - yM) \cdot (xE2 - xE1, yE2 - yE1) = 0 \quad (3)$$

As is understood from the above description, the image correction module 30 of the second embodiment identifies the function f(x) expressing the shape approximation line Q by selecting the coordinates (xP, f(xP)) of the intersection point P and the variable θk of the function f(x) so that the distance index Z(x) is minimized under the condition of the expression (3). The first term of the right side of the expression (2) is the sum total of the distances D (D=(xP−xM)²+(f(xP)−yM)²) of the number, N, of line segments L, and the second term thereof is the regularization term for suppressing the divergence of the optimum solution of the distance index Z(x). Moreover, the expression (3) means a condition that the line segment L and the straight line V of FIG. 11 are orthogonal to each other. While a known optimization method may be arbitrarily adopted for the identification of the shape approximation line Q (the calculations of the expression (2) and the expression (3)), an analytical optimization method such as Lagrange's method of undetermined multipliers is suitable.

Figure 12:
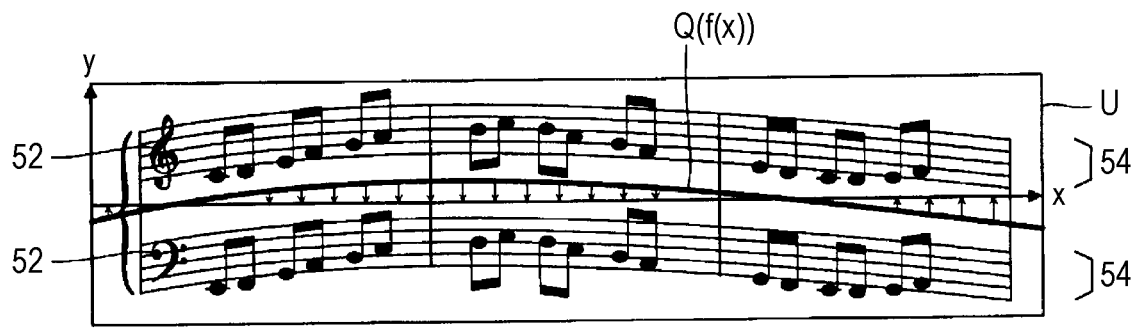
FIG. 12 is an explanatory view of image correction using the shape approximation line.

The image correction module 30 generates the partial image UA by correcting the partial image U by using the shape approximation line Q (the function f(x)) identified by the above-described procedure (SB3). For example, the image correction module 30 generates the corrected partial image UA by moving the pixels of the partial image U within the x-y plane so that the shape approximation line Q of each partial image U is converted into a straight line parallel to the x axis (that is, the curve of each staff 54 is resolved). Specifically, for example as shown by example in FIG. 12, the partial image UA is generated by moving the pixels in the partial image U in the direction of the y axis by a distance corresponding to the function value of the function f(x) (the difference between the function f(x) and the straight line y=0). However, the method of correction of the partial image U using the shape approximation line Q is not limited to the above example.

In the second embodiment, effects similar to those of the first embodiment are realized. Moreover, in the second embodiment, the partial image U is corrected by using the shape approximation line Q according to the distribution of a plurality of line segments L in the partial image U. Consequently, the distortion of the musical score due to the deformation of the surface of the musical score can be corrected by a simple structure and processing without the need for a distance measurement device that measures the distance from the book at a plurality of points.

Moreover, in the first embodiment, since the shape approximation line Q is identified so that the distance index Z(x) obtained by adding the distances D, between the line segment L and the shape approximation line Q, of the number, N, of line segments L is minimized (that is, the distribution of a plurality of line segments L is reflected in the shape approximation line Q), an advantage is produced that an appropriate shape approximation line Q that highly precisely approximates the surface shape of the musical score can be identified. In the first embodiment, since the shape approximation line Q is identified from a plurality of line segments L corresponding to two adjoining staffs 54 (that is, a grand staff), an appropriate shape approximation line Q that highly precisely approximates the surface shape of the musical score can be identified compared with a structure where the shape approximation line Q is identified from only one of the staffs 54.

<Modifications>

The modes shown above by example may be modified variously. Concrete modes of modifications are shown below by example. Two or more modes arbitrarily selected from the following examples may be combined as appropriate as long as no contradiction arises therebetween.

(1) While the reference image G0 is selected before the execution of the processing related to the partial image U (SA2 to SA5) in the above-described embodiments, the reference image G0 may be updated whenever necessary in parallel with the moving image capturing by the capturing device 12. For example, a structure is adopted in which the captured image GA where the image index WG is maximum is updated as the reference image G0.

(2) While an instruction from the user ends the image synthesis processing of FIG. 7 (SA6: YES) in the above-described embodiments, what ends the image synthesis processing (determines the synthetic image GB) is not limited to an instruction from the user. For example, the image synthesis processing may be ended when the partial images U in the captured image GA are synthesized over the entire area corresponding to the partial images U in the reference image G0.

(3) While the evaluation index W corresponding to the ratio $\lambda(j)$ of the staff 54 contained in the staff area 58(j) is calculated in the above-described embodiments, the method of calculation of the evaluation index W is not limited to the above examples. For example, the evaluation index W corresponding to the ratio of the area of the partial image U not covered with the user's hand H (that is, an element other than the original subject) or the evaluation index W corresponding to the degree of distortion of the staff 54 due to the deformation of the surface of the musical score may be calculated for each partial image U. For example, a structure is also assumed in which the evaluation index W is calculated according characteristic values such as the clarity and contrast of the partial image U. As is understood from the above description, the evaluation index W of each partial image U is comprehensively expressed as the index as to whether the capturing condition of the partial image U is appropriate or not. The capturing condition indicated by the evaluation index W includes various conditions related to the partial image U such as capturing conditions such as the capturing direction, the presence or absence of an element that hinders the capturing of the subject (for example, the user's hand H), distortion in the partial image U and characteristic values such as the clarity and contrast of the partial image U.

(4) While a structure in which the evaluation index W increases as the capturing condition of the partial image U becomes more excellent is shown by example in the above-described embodiments, the relation between the appropriateness of the capturing condition and the value of the evaluation index W may be reversed. That is, the evaluation index W may be calculated so that the evaluation index W decreases as the capturing condition becomes more excellent. In the above-described structure, the image selection module 24 selects the partial image U the evaluation index W of which is lower than the threshold value WTH.

(5) While the partial image U the evaluation index W of which is higher than the threshold value WTH is selected in the above-described embodiments, the method of selection of the partial image U is not limited to the above example. For example, the image selection module 24 may select a partial image U, ranked high in the order of the evaluation index W, of a plurality of partial images U of a predetermined number of (one or a plurality of) captured images GA. As is understood from the above example, the comparison between the evaluation index W and the threshold value WTH is not essential processing for the selection of the partial image U. That is, the image selection module 24 is comprehensively expressed with a plurality of partial images U corresponding to different areas of the musical score as elements selected from a plurality of captured images GA according to the evaluation indices W of the partial images U.

(6) While the partial image U corresponding to two of the staffs 54 (that is, a grand staff) is shown by example in the above-described embodiments, for example, an area corresponding to one of the staffs 54 or an area over three or more staffs may be zoned in the captured image GA as the partial image U.

(7) The musical character 52(j) calculated by the index calculation module 22 is not limited to a G clef and an F clef. For example, one of a G clef and an F clef or a C clef may be detected as the musical character 52(*j*). Moreover, for example, when a tab score in which a way of playing (specifically, fingering) is shown on a staff 54 formed of a plurality of straight lines corresponding to strings of a stringed instrument, respectively, is captured by the capturing device 12, a character string "TAB" vertically written on the left end of each staff 54 may be detected as the musical character 52(*j*).

(8) While a case where the capturing device 12 photographs a musical score is shown by example in the above-described embodiments, the subject of the capturing device is not limited to a musical score. For example, the present invention may be used in given capturing instances including a case where a document such as a book or printed matter is captured.

(9) While a plurality of captured images GA are generated by moving image capturing by the capturing device in the above-described embodiments, it is not always necessary that the images constituting a moving image be the captured images GA. For example, the synthetic image GB may be generated by using, as the captured images GA, images successively captured as still images by the capturing device 12.

(10) The image processing apparatus 100 may be implemented by a server apparatus that communicates with a terminal apparatus (for example, a mobile telephone or a smartphone) through a communication network such as a mobile communication network or the Internet. Specifically, the image processing apparatus 100 successively receives, from a terminal apparatus, the captured images GA generated by the capturing device 12 mounted on the terminal apparatus, and transmits to the terminal apparatus the synthetic image GB synthesized by the image synthesis processing on the captured images GA. Moreover, the image processing apparatus 100 may be implemented by an aggregation of a plurality of apparatuses formed separately from each other (for example, a system including a terminal apparatus and a server apparatus), and sharing of the functions among a plurality of apparatuses constituting the image processing apparatus 100 is arbitrary.

(11) The image processing apparatus 100 shown by example in the above-described embodiments is implemented by the cooperation of the control device 14 and a program as in the examples of the preferred embodiments. The program according to the preferred embodiments of the present invention causes a computer to function as: the index calculation module 22 that calculates, with respect to each of a plurality of captured images GA obtained by successively capturing a subject (for example, a musical score), an evaluation index W as the index as to whether the capturing condition is appropriate or not for each of the partial images U of the captured image GA corresponding to different areas of the subject; the image selection module 24 that selects a plurality of partial images U corresponding to different areas of the subject from a plurality of captured images GA according to the evaluation indices W of the partial images U; and the image synthesis module 26 that synthesizes each of the plurality of partial images U selected by the image selection module 24 in the position, corresponding to the partial image U, of the reference image G0 obtained by capturing the subject. The program shown above by example may be provided in a mode of being stored in a computer-readable recording medium and installed on a computer. While the recording medium is, for example, a non-transitory recording medium and an optical recording medium (optical disk) such as a CD-ROM is a good example, recording media of given known formats such as a semiconductor recording medium and a magnetic recording medium may be embraced. Moreover, the program may be delivered to the computer in a mode of delivery through a communication network.

(12) The present invention may also be identified as an operation method (image processing method) of the image processing apparatus 100 according to the above-described embodiments. For example, in an image correction method according to one mode of the present invention, with respect to each of a plurality of captured images GA obtained by successively capturing a subject (for example, a musical score), an evaluation index W as the index as to whether the capturing condition is appropriate or not is calculated for each of the partial images U of the captured image GA corresponding to different areas of the subject (SA2), a plurality of partial images U corresponding to different areas of the subject are selected from a plurality of captured images GA according to the evaluation indices W of the partial images U (SA3), and the plurality of partial images U being selected are synthesized in positions, corresponding to the partial images U, of the reference image G0 obtained by capturing the subject (SA4).

An image processing apparatus according to a preferred mode of the present invention is provided with: the index calculation module that calculates, with respect to each of a plurality of captured images obtained by successively capturing a subject, the evaluation index as the index as to whether the capturing condition is appropriate or not for each of a plurality of partial images of the captured image corresponding to different areas of the subject; the image selection module that selects the plurality of partial images corresponding to the different areas of the subject from the plurality of captured images according to the evaluation indices of the partial images; and the image synthesis module that synthesizes each of the plurality of partial images selected by the image selection module in the position, corresponding to the partial image, of the reference image obtained by capturing the subject. In the above mode, the plurality of partial images selected according to the evaluation index from the plurality of captured images are synthesized in the positions of the reference image corresponding to the partial images. Consequently, an image where the capturing condition is excellent over a wide area of the surface of the subject can be generated.

In a preferred mode of the present invention, the index calculation module zones the captured images obtained by capturing, as the subject, a musical score containing a plurality of staffs disposed in parallel to each other, into the partial images every aggregation of a predetermined number of adjoining staffs, and calculates the evaluation index for each of the partial images. In the above mode, since the calculation of the evaluation index and the selection and synthesis of the partial image are executed by using, as a unit, the partial image obtained by zoning the captured image every aggregation of a plurality of number of staffs in the musical score, the possibility is reduced that one staff in the captured image is divided into a plurality of partial images. Consequently, a natural image of the musical score where division or intermittence (for example, discontinuity of a straight line) of one staff is suppressed can be generated.

In a preferred mode of the present invention, the index calculation module detects a plurality of musical characters from the captured images obtained by capturing the musical score containing the plurality of staffs and the musical characters disposed in predetermined positions of the staffs, and calculates, for each of the partial images, the evaluation index corresponding to the ratio of the staffs in the staff area intersecting the musical character array which is an array of the plurality of musical characters in positions of the musical characters. In the above mode, the evaluation index is calculated according to the ratio of the staffs in the staff area intersecting the musical character array which is an array of a plurality of musical characters in the positions of the musical characters. Consequently, the evaluation index by which whether the capturing direction is appropriate or not can be quantitatively evaluated can be calculated.

In a preferred mode of the present invention, the image synthesis module synthesizes each of the plurality of partial images to the reference image so that corresponding ones of feature points extracted from the reference image and feature points extracted from the partial image coincide with each other. In the above mode, since the positions of the partial images with respect to the reference image are selected so that corresponding ones of the feature points of the reference image and the feature points of the partial images coincide with each other, an image faithfully reflecting the subject can be generated.

In a preferred mode of the present invention, the index calculation module successively calculates, with respect to each of the plurality of captured images constituting a moving image obtained by capturing the subject, the evaluation index for each of the partial images in parallel with capturing of the moving image, the image selection module successively executes the partial image selection according to the evaluation index in parallel with the capturing of the moving image, and the image synthesis module successively executes the partial image synthesis to the reference image in parallel with the capturing of the moving image. In the above mode, with respect to each of the plurality of captured images constituting the moving image obtained by capturing the subject, the calculation of the evaluation index for each partial image by the index calculation module, the selection of the partial image by the image selection module and the synthesis of the partial image by the image synthesis module are successively executed in parallel with the moving image capturing. Consequently, an image can be generated in parallel with the progress of moving image capturing without the user providing a capturing instruction for each of the plurality of captured images.

According to the present invention, an image the capturing condition of which is excellent over a wide area of the surface of the subject, for example, a musical score can be generated.

What is claimed is:

1. An image processing apparatus comprising:
a memory storing instructions; and
a processor that implements the instructions to:
zone a plurality of capture partial images, which have been obtained by successively capturing portions of a musical score containing a plurality of staffs disposed parallel to each other, each including every aggregation of a predetermined number of adjoining staffs;
calculate an evaluation index regarding whether a capturing condition is appropriate or not for each of the plurality of captured partial images corresponding to different areas of the musical score;
select partial images, among the plurality of captured partial images, based on the evaluation indices of the plurality of captured partial images; and
synthesize the selected partial images in positions corresponding to respective partial images in a reference image obtained by capturing the musical score.

2. The image processing apparatus according to claim 1, wherein:
the processor implements the instructions to detect a plurality of musical characters from the plurality of captured partial images and a plurality of musical characters respectively disposed in predetermined positions of the plurality of staffs, and
the evaluation index of each of the plurality of captured partial image corresponds to a ratio of the staffs in a staff area intersecting a musical character array of the plurality of musical characters in positions of the musical characters.

3. The image processing apparatus according to claim 1, wherein the selected partial images are synthesized to the reference image so that corresponding ones of feature points extracted from the reference image and feature points extracted from the selected partial images coincide with each other.

4. The image processing apparatus according to claim 1, wherein the processor implements the instructions to:
successively calculate the evaluation index for each of the plurality of captured partial images, each constituting a moving image obtained by capturing the musical score while capturing the moving image;
successively select each partial image based on the evaluation index while capturing the moving image; and
successively synthesize each partial image to the reference image while capturing the moving image.

5. An image processing method comprising:
zoning a plurality of captured partial images, which have been obtained by successively capturing portions of a musical score containing a plurality of staffs disposed parallel to each other, each including every aggregation of a predetermined number of adjoining staffs;
calculating an evaluation index regarding whether a capturing condition is appropriate or not for each of the plurality of captured partial images corresponding to different areas of the musical score;
selecting partial images, among the plurality of captured partial images, based on the evaluation indices of the plurality of captured partial images; and
synthesizing the selected partial images in positions corresponding to respective partial images in a reference image obtained by capturing the musical score.

6. The image processing method according to claim 5, further comprising:
detecting a plurality of musical characters from the plurality of captured partial images and a plurality of musical characters respectively disposed in predetermined positions of the plurality of staffs; and
wherein the evaluation index of each of the plurality of captured partial image corresponds to a ratio of the staffs in a staff area intersecting a musical character array of the plurality of musical characters in positions of the musical characters.

7. The image processing method according to claim 5, the selected partial images are synthesized to the reference image so that corresponding ones of feature points extracted from the reference image and feature points extracted from the selected partial images coincide with each other.

8. The image processing method according to claim 5, further comprising:
successively calculating the evaluation index for each of the plurality of captured partial images, each constituting a moving image obtained by capturing the musical score while capturing the moving image;

successively selecting each partial image based on the evaluation index while capturing the moving image; and successively synthesizing each partial image to the reference image while capturing the moving image.

* * * * *